United States Patent
Liu et al.

(10) Patent No.: US 12,375,973 B2
(45) Date of Patent: Jul. 29, 2025

(54) DATA TRANSMISSION METHOD, APPARATUS, AND DEVICE

(71) Applicants: China Mobile Communication Co., Ltd Research Institute, Beijing (CN); China Mobile Communications Group Co., Ltd., Beijing (CN)

(72) Inventors: Guangyi Liu, Beijing (CN); Junshuai Sun, Beijing (CN); Yuhong Huang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 430 days.

(21) Appl. No.: 18/013,614

(22) PCT Filed: Jul. 7, 2021

(86) PCT No.: PCT/CN2021/104920
§ 371 (c)(1),
(2) Date: Dec. 29, 2022

(87) PCT Pub. No.: WO2022/007829
PCT Pub. Date: Jan. 13, 2022

(65) Prior Publication Data
US 2023/0292178 A1    Sep. 14, 2023

(30) Foreign Application Priority Data

Jul. 7, 2020 (CN) .......................... 202010646878.8

(51) Int. Cl.
*H04W 28/06*    (2009.01)
*H04W 28/24*    (2009.01)

(52) U.S. Cl.
CPC ......... *H04W 28/065* (2013.01); *H04W 28/24* (2013.01)

(58) Field of Classification Search
CPC ........................... H04W 28/065; H04W 28/24
See application file for complete search history.

(56) References Cited

U.S. PATENT DOCUMENTS 6,654,363 B1    11/2003   Li et al.
11,418,951 B2*   8/2022   Tang ................... H04W 12/033
(Continued)

FOREIGN PATENT DOCUMENTS

CN    102868643 A    1/2013
CN    103404179 A   11/2013
(Continued)

OTHER PUBLICATIONS

Ericsson, Architecture for integrated access and backhaul, Discussion, Decision, 3GPP TSG-RAN WG2 NR AH1801, R2-1801022, Jan. 22-26, 2018, Vancouver, Canada.
(Continued)

*Primary Examiner* — Ajay Cattungal
(74) *Attorney, Agent, or Firm* — Price Heneveld LLP

(57) ABSTRACT

Embodiments of the present disclosure provide a data transmission method, an apparatus, and a device; the data transmission method is applicable to layer 2 L2, and includes: performing data packet transmission between a second functional entity of a media access control (MAC) of L2 and a first functional entity of layer 3 L3.

20 Claims, 5 Drawing Sheets

(56) References Cited

U.S. PATENT DOCUMENTS

| | | | |
|---|---|---|---|
| 2014/0140335 A1 | 5/2014 | Wang et al. | |
| 2015/0215918 A1* | 7/2015 | Wu | H04W 24/10 |
| | | | 370/329 |
| 2017/0094654 A1* | 3/2017 | Yang | H04L 47/824 |
| 2017/0257866 A1 | 9/2017 | Chaudhuri et al. | |
| 2018/0139651 A1* | 5/2018 | Kim | H04L 5/00 |
| 2020/0045596 A1* | 2/2020 | Liu | H04W 76/27 |
| 2021/0368501 A1* | 11/2021 | Hamidi-Sepehr | |
| | | | H04W 72/0446 |
| 2023/0072763 A1* | 3/2023 | Kim | H04W 76/20 |
| 2023/0107528 A1* | 4/2023 | Liu | H04L 1/1848 |
| | | | 370/329 |

FOREIGN PATENT DOCUMENTS

| | | |
|---|---|---|
| CN | 103716881 A | 4/2014 |
| CN | 104010277 A | 8/2014 |
| CN | 107359968 A | 11/2017 |
| EP | 3499922 A1 | 6/2019 |
| WO | 2019175805 A1 | 9/2019 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 16), 3GPP TR 36.300 V16.1.0 (Mar. 2020), Valbonne, France.

* cited by examiner

DATA TRANSMISSION METHOD, APPARATUS, AND DEVICE

CROSS REFERENCE OF RELATED APPLICATION

This application is the U.S. national phase of PCT Application No. PCT/CN2021/104920 filed on Jul. 7, 2021, which claims priority to Chinese Patent Application No. 202010646878.8 filed on Jul. 7, 2020, the disclosures of which are incorporated in their entirety by reference herein.

TECHNICAL FIELD

The present disclosure relates to the field of communication technology, and in particular, refers to a data transmission method, an apparatus, and a device.

BACKGROUND

In the third generation (3rd Generation, 3G)/fourth generation (4th Generation, 4G)/fifth generation (5th Generation, 5G) system, there is only a control plane (CP) at the AS layer (terminal side. For the network side, it is the RRC protocol layer), that is, only an RRC protocol layer (or sublayer). The radio resource control (RRC) protocol layer completes the radio resource control function, and does not have the data processing function of the UP plane.

Packet processing function of L2 of the existing AS layer is redesigned, the packet processing function of the new L2 is mainly to undertake the specialty of the upper-layer service data, and combine the channel specialty of the lower-layer air interface to form an index and operation that takes into account the air interface and the quality of service (QoS) of service characteristic.

The L2 data plane function in 5G includes protocol functional entity such as Service Data Adaptation Protocol (SDAP), Packet Data Convergence Protocol (PDCP), Radio Link Control (RLC) and MAC. For example, the user plane protocol stack given in FIG. 4.4.1-1 in the 38.300 protocol.

The functions of the relevant SDAP/PDCP/RLC/MAC protocols in data packet processing are defined by the relevant L2 protocols. The processing of data packets respectively includes: multiplexing, header pressure/decompression, encryption/decryption, segmentation, retransmission and other functions.

In related technologies, the data processing of the 5G radio access layer protocol stack has a large redundancy, for example, RLC has a sorting function for segmented data packets, and PDCP has a sorting function for all data packets, no matter how different the delay or reliability requirements of the three types of services including Ultra-Reliable and Low Latency Communications (URLLC)/enhanced Mobile Broadband (eMBB)/massive Machine Type Communication (mMTC) are, the functions of the used protocol stacks are almost the same (RLC AM or UM mode), which cannot meet the needs of the service.

SUMMARY

The present disclosure provides a data transmission method, an apparatus and a device. For realizing the simplification of the L2 layer, it no longer needs to process the data with multi-layer protocols.

In order to solve the above-mentioned technical problems, embodiments of the present disclosure provide the following solutions:

a data transmission method, applied to a Layer 2 L2, including:
performing data packet transmission between a second functional entity of a media access control (MAC) of the L2 and a first functional entity of a layer 3 L3, where the first functional entity of the layer 3 L3 is a functional entity of an access stratum (AS) for processing user plane (UP) data.

Optionally, the performing data packet transmission between the second functional entity of the MAC of the L2 and the first functional entity of the layer 3 L3, including:
receiving, by the second functional entity of the MAC of the L2, the data packet sent by the first functional entity of the layer 3 L3, and sending the processed data packet to the layer 1 L1.

Optionally, the performing data packet transmission between the second functional entity of the MAC of the L2 and the first functional entity of the layer 3 L3, including:
receiving, by the second functional entity of the L2, data from L1, processing the data to obtain the data packet, and sending the data packet to the first functional entity of L3.

Optionally, the receiving, by the second functional entity of the MAC of the L2, the data packet sent by the first functional entity of the layer 3 L3, and sending the processed data packet to the layer 1 L1, including:
receiving, by the second functional entity of the L2, the data packet sent by the first functional entity of the L3;
assembling, by the second functional entity of the L2, the data packet into a media access control protocol data unit (MAC PDU), and sending the MAC PDU to the L1.

Optionally, the data transmission method further includes at least one of following:
determining, by the second functional entity of the L2, a quality of service (QoS) characteristic value of a lower-layer bearer, according to a QoS flow group or a QoS parameter of the lower-layer bearer configured by the radio resource control (RRC) or instructed by the MAC scheduler; or
mapping, by the second functional entity of the L2, an upper-layer bearer to the lower-layer bearer, according to the QoS characteristic value of the lower-layer bearer.

Optionally, the mapping, by the second functional entity of the L2, the upper-layer bearer to the lower-layer bearer, according to the QoS characteristic value of the lower-layer bearer, including:
mapping, by the second functional entity of the L2, directly the upper-layer bearer to the lower-layer bearer, in a case that the QoS characteristic value of the lower-layer bearer meets a QoS requirement of the upper-layer bearer; or
in a case that the QoS characteristic value of the lower-layer bearer does not meet the QoS requirement of the upper-layer bearer, modifying, by the second functional entity of the L2, the QoS characteristic value thereof to meet the QoS requirement of the upper-layer bearer, mapping, by the second functional entity of the L2, the upper-layer bearer to the lower-layer bearer, or,
in a case that there is no lower-layer bearer matching the QoS requirement of the upper-layer bearer, selecting, by the second functional entity of the L2, one lower-layer bearer, according to the QoS parameter of the upper-layer bearer, mapping, by the second functional entity of the L2, the upper-layer bearer to the lower-layer bearer.

Optionally, the lower-layer bearer includes: a logical channel, a transmission channel and/or a physical channel.

Optionally, each of the lower-layer bearers has a data buffer unit, data packets of one or more upper-layer bearer are carried on one lower-layer bearer, where each data packet of the upper-layer bearer carried on the lower-layer bearer is cached in a cache of the lower-layer bearer.

Optionally, a number of the upper-layer bearer carried on the lower-layer bearer inside the MAC is composed of an identifier of the lower-layer bearer and an identifier of the upper-layer bearer inside the lower-layer bearer.

Optionally, the data transmission method further includes: classifying the upper-layer bearers according to the QoS parameters to obtain a plurality of upper-layer bearer groups.

Optionally, the QoS characteristic value of the lower-layer bearer is determined according to the QoS characteristic value of the upper-layer bearer carried by the lower-layer bearer and/or according to a statistical characteristic value of an air interface by the scheduler of the L2 MAC.

Optionally, the assembling the data packet into the MAC PDU, and sending the MAC PDU to the L1, including:
  assembling the data packet into the MAC PDU, and sending the MAC PDU to the L1, according to an instruction of the scheduler in the MAC of the L2.

Optionally, the data transmission method further includes: performing reassembly of the MAC PDU on the upper-layer bearer, when the second functional entity of the L2 performs data reassembly according to an instruction of the scheduler.

Optionally, at least one of following is carried in the MAC PDU:
  an identifier (ID) of the lower-layer bearer, an ID of the upper-layer bearer to which the MAC PDU belongs, an identifier N of whether data on a plurality of upper-layer bearers are included at the same time, a data packet length, or a length indicating identifier of the data packet length.

Optionally, the receiving, by the DP functional entity of the L2, data from L1, processing the data to obtain the data packet, and sending the data packet to the first functional entity of L3, including:
  receiving, by the second functional entity of the L2, data from the L1 layer;
  processing the received data according to the instruction of the scheduler to obtain MAC PDU;
  parsing the MAC PDU to obtain MAC service data unit (MAC SDU) for the identifier of the lower-layer bearer, and the identifier of the upper-layer bearer in the lower-layer bearer;
  sending the MAC SDU to the first functional entity of the L3.

The embodiment of the present disclosure also provides a data transmission apparatus, applied to a communication device, where the communication device includes a Layer 3 L3, a Layer 2 L2, and a Layer 1 L1, where data packet transmission is performed between a second functional entity of a media access control (MAC) of the L2 and a first functional entity of the layer 3 L3, the first functional entity of the layer 3 L3 is a functional entity of an access stratum (AS) for processing user plane (UP) data.

Optionally, the performing data packet transmission between the second functional entity of the MAC of the L2 and the first functional entity of the layer 3 L3 includes:
  receiving, by the second functional entity of the L2, the data packet sent by the first functional entity of the layer 3 L3, and sending the processed data packet to the layer 1 L1.

Optionally, the performing data packet transmission between the second functional entity of the MAC of the L2 and the first functional entity of the layer 3 L3 includes:
  receiving, by the second functional entity of the L2, data from L1, processing the data to obtain the data packet, and sending the data packet to the first functional entity of L3.

Optionally, the receiving, by the second functional entity of the MAC of the L2, the data packet sent by the first functional entity of the layer 3 L3, and sending the processed data packet to the layer 1 L1, including:
  receiving, by the second functional entity of the L2, the data packet sent by the first functional entity of the L3;
  assembling, by the second functional entity of the L2, the data packet into a media access control protocol data unit (MAC PDU), and sending the MAC PDU to the L1.

Optionally, the data transmission apparatus further includes: determining, by the second functional entity of the L2, a quality of service (QoS) characteristic value of a lower-layer bearer, according to a QoS flow group or a QoS parameter of the lower-layer bearer configured by the radio resource control (RRC) or instructed by the MAC scheduler; or
  mapping, by the second functional entity of the L2, an upper-layer bearer to the lower-layer bearer, according to the QoS characteristic value of the lower-layer bearer.

Optionally, the mapping, by the second functional entity of the L2, the upper-layer bearer to the lower-layer bearer, according to the QoS characteristic value of the lower-layer bearer, including:
  mapping, by the second functional entity of the L2, directly the upper-layer bearer to the lower-layer bearer, in a case that the QoS characteristic value of the lower-layer bearer meets a QoS requirement of the upper-layer bearer; or
  in a case that the QoS characteristic value of the lower-layer bearer does not meet the QoS requirement of the upper-layer bearer, modifying, by the second functional entity of the L2, the QoS characteristic value thereof to meet the QoS requirement of the upper-layer bearer, mapping, by the second functional entity of the L2, the upper-layer bearer to the lower-layer bearer, or,
  in a case that there is no lower-layer bearer matching the QoS requirement of the upper-layer bearer, selecting, by the second functional entity of the L2, one lower-layer bearer, according to the QoS parameter of the upper-layer bearer, mapping, by the second functional entity of the L2, the upper-layer bearer to the lower-layer bearer.

Optionally, the lower-layer bearer includes: a logical channel, a transmission channel and/or a physical channel.

Optionally, each of the lower-layer bearers has a data buffer unit, data packets of one or more upper-layer bearer are carried on one lower-layer bearer, where each data packet of the upper-layer bearer carried on the lower-layer bearer is cached in a cache of the lower-layer bearer.

Optionally, a number of the upper-layer bearer carried on the lower-layer bearer inside the MAC is composed of an identifier of the lower-layer bearer and an identifier of the upper-layer bearer inside the lower-layer bearer.

Optionally, the second functional entity of the L2 classifies the upper-layer bearers according to the QoS parameters to obtain a plurality of upper-layer bearer groups.

Optionally, the QoS characteristic value of the lower-layer bearer is determined according to the QoS characteristic value of the upper-layer bearer carried by the lower-layer bearer and/or according to a statistical characteristic value of an air interface by the scheduler of the L2 MAC.

Optionally, the assembling the data packet into the MAC PDU, and sending the MAC PDU to the L1, including:
assembling the data packet into the MAC PDU, and sending the MAC PDU to the L1, according to an instruction of the scheduler in the MAC of the L2.

Optionally, the data transmission apparatus further includes:
performing reassembly of the MAC PDU on the upper-layer bearer, when the second functional entity of the L2 performs data reassembly according to an instruction of the scheduler.

Optionally, at least one of following is carried in the MAC PDU:
an identifier (ID) of the lower-layer bearer, an ID of the upper-layer bearer to which the MAC PDU belongs, an identifier N of whether data on a plurality of upper-layer bearers are included at the same time, a data packet length, or a length indicating identifier of the data packet length.

Optionally, the receiving, by the second functional entity of the L2, data from L1, processing the data to obtain the data packet, and sending the data packet to the first functional entity of L3, including:
receiving, by the second functional entity of the L2, data from the L1 layer;
processing the received data according to the instruction of the scheduler to obtain MAC PDU;
parsing the MAC PDU to obtain MAC service data unit (MAC SDU) for the identifier of the lower-layer bearer, and the identifier of the upper-layer bearer in the lower-layer bearer;
sending the MAC SDU to the first functional entity of the L3.

The embodiment of the present disclosure also provides a communication device, including: a Layer 3 L3, a Layer 2 L2, and a Layer 1 L1, where a transceiver of the L2 is configured to transmit data packet between a second functional entity of a media access control (MAC) of the L2 and a first functional entity of the layer 3 L3, and the first functional entity of the layer 3 L3 is a functional entity of an access stratum (AS) for processing user plane (UP) data.

The embodiment of the present disclosure also provides a communication device, including: a processor, and a memory storing a computer program, when the computer program is run by the processor, the above-mentioned methods are performed.

The embodiment of the present disclosure also provides a computer-readable storage medium, including instructions, where when the instructions are run on a computer, the computer is enabled to perform the above-mentioned methods.

The above solutions of the present disclosure at least include the following beneficial effects:

In the above solutions of the present disclosure, data packet transmission is performed between a second functional entity of a media access control (MAC) of L2 and a first functional entity of layer 3 L3. Here, L2 transmits data packets between the second functional entity and the first functional entity of L3, so that L2 can directly transmit data packets with the first functional entity of L3, data processing with multi-layer protocols is no longer performed in L2, thereby realizing the simplification of L2. Further, the second functional entity of the media access control (MAC) of L2 receives the data packet sent by the first functional entity of L3, and sends the data packet to L1; the second functional entity of L2 receives data from L1, processes the data to obtain a data packet, and sends the data packet to the first functional entity of L3. Here, L2 sends the data packet to the L1 layer directly, and sends the data of the L1 layer to the L3 layer directly, thereby realizing the simplification of the L2 layer, and it is no longer necessary to process the data with multi-layer protocols.

DETAILED DESCRIPTION

Figure 1:
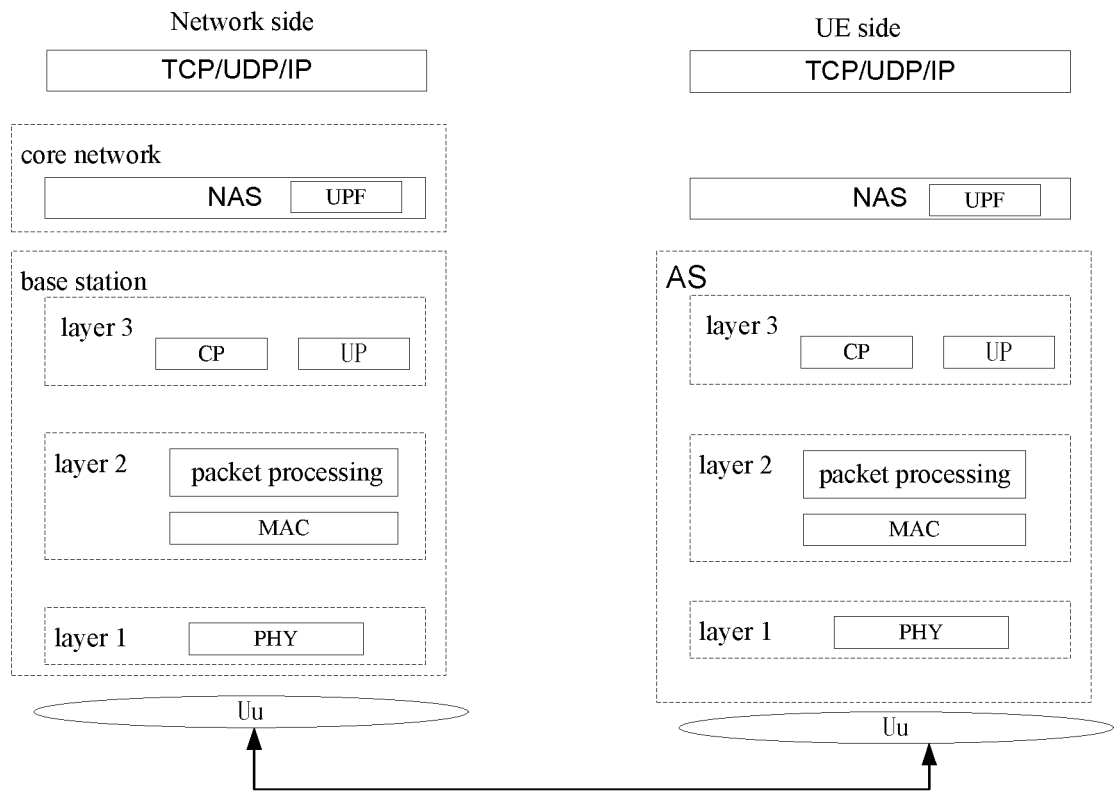
FIG. 1 is a functional schematic view of a AS layer protocol stack.
Figure 2:
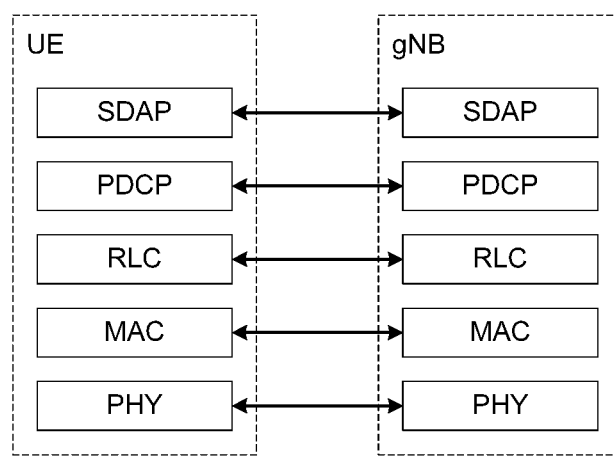
FIG. 2 is a schematic view of a protocol functional entity of an L2 data plane functional entity.

Exemplary embodiments of the present disclosure will be described in more detail below with reference to the drawings. Although exemplary embodiments of the present disclosure are shown in the drawings, it should be understood that the present disclosure may be embodied in various forms and should not be limited by the embodiments set forth herein. Rather, these embodiments are provided for more thorough understanding of the present disclosure and to fully convey the scope of the present disclosure to those skilled in the art.

For the design goal of the next-generation mobile communication Lite Network, it is proposed to introduce the user plane function in L3 for performing data processing.

As shown in FIG. 1, the user plane (UP) function is introduced into Layer 3 (Layer 3, L3, the RRC layer of the access stratum (AS) layer in the 5G system is called a 3-layer protocol) of the AS.

For RRC, in addition to the radio resource management function in traditional related technologies, the UP function of L3 is responsible for processing the storage and forwarding of data packet at the AS layer, and during the data transmission process, the L3 UP completes the support processing function of the data through the data air interface sending and receiving status reported by the L2, that is, whether the data packet is sent correctly or not. For media access control (MAC), the real-time scheduling and control function of the L2 packet processing function is added.

The UP of the L3 of the AS layer has a function of sending an Internet protocol (IP) packet for the first time or more than once. With the introduction of the UP function of L3, the existing data processing functions of L2 need to be redefined.

In the embodiment of the present disclosure, the user plane (UP) functional entity of the L3 sends the data packet to the MAC functional entity of the L2. The MAC functional entity schedules and completes the assembly of MAC PDU, and sends the assembly of MAC PDU to the air interface, after receiving the data packet.

Data service functions are provided for L2 through the UP functional entity of L3, which includes data length or quantity, data format, data backup and data retransmission services etc., provided according to the requirements of L2.

Based on the functions of L3 UP, L2 provides L3 UP with various control information such as data sending and receiving instructions, data retransmission instructions, data backup and update instructions, thereby realizing that the L3 UP layer distributes precisely data packets.

The AS layer includes layer 1 (Layer 1, L1, physical layer), layer 2 (Layer 2, L2) and layer 3 (Layer 3, L3).

Figure 3:
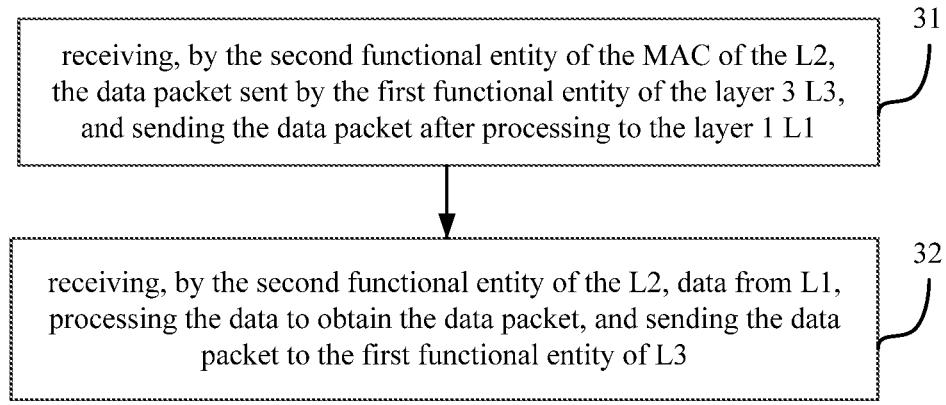
FIG. 3 is a flowchart of a data transmission method provided in the present disclosure.

As shown in FIG. 3, an embodiment of the present disclosure provides a data transmission method, which is applied to Layer 2 L2, and the method includes:

step 30, performing data packet transmission between a second functional entity of a media access control (MAC) of the L2 and a first functional entity of a layer 3 L3. Here, L2 performs the data packet transmission between the second functional entity and the first functional entity of L3, so that L2 can directly transmit data packets with the first functional entity of L3, and L2 no longer needs to perform the processing of multi-layer protocols on data, thereby realizing the simplification of L2.

Further, the step 30 may include:
step 31, receiving, by the second functional entity of the MAC of the L2, the data packet sent by the first functional entity of the layer 3 L3, and sending the processed data packet to the layer 1 L1, where the data packet here may include a control data packet (such as control PDU and data packets (e.g. data PDU)); here, when the UP functional entity of L3 sends the data packet to L2, the data packet can be sent through IP flow, or through logical channel or radio bearer RB; the first functional entity here may be similar to the UP functional entity, which has the ability of receiving and sending data; the second functional entity here may be a data process (DP) functional entity of the MAC, which can receive data packets sent by L3, and can also receive data packets sent by L1, and has the ability of receiving and sending data;

Step 32, receiving, by the second functional entity of L2, data from L1, processing the data to obtain the data packet, and sending the data packet to the first functional entity of L3.

In this embodiment, the first functional entity of L3 sends the data packet to the data process DP functional entity of the MAC layer through the IP flow, and the DP functional entity of the MAC layer can also send the data packet obtained after parsing the data packet received from L1 to the first functional entity of L3 through the IP flow.

Figure 4:
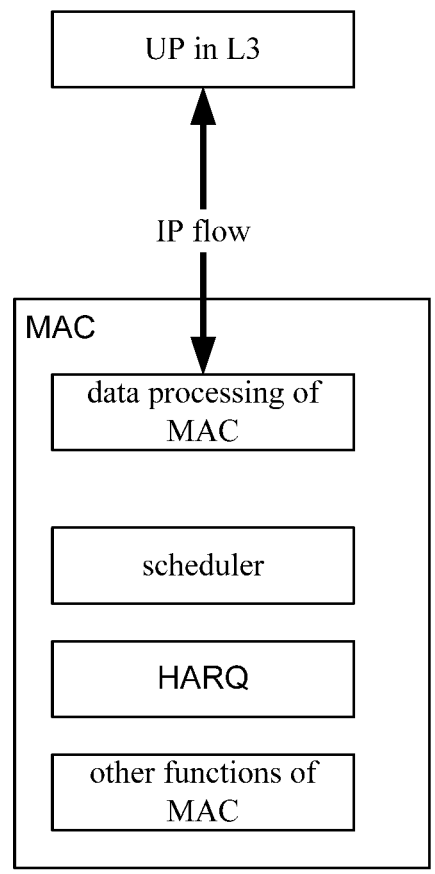
FIG. 4 is an overall schematic view of a DP functional entity of a MAC.

As shown in FIG. 4, in the embodiment of the present disclosure, the MAC basic function includes a DP functional entity, a scheduler, a hybrid automatic repeat request (HARM) functional entity and other functional entities.

In an optional embodiment of the present disclosure, step 31 may include:
receiving, by the second functional entity of the L2, the data packet sent by the first functional entity of L3;
assembling, by the second functional entity of the L2, the data packet into a media access control protocol data unit (MAC PDU), and sending the MAC PDU to the L1.

In an optional embodiment of the present disclosure, the above-mentioned method may also include:

determining, by the second functional entity of the L2, a quality of service (QoS) characteristic value of a lower-layer bearer, according to a QoS flow group or a QoS parameter (the configuration is the QoS characteristic value of multiple IP flows) of the lower-layer bearer configured by the radio resource control (RRC) or instructed by the MAC scheduler; or mapping, by the second functional entity of the L2, an upper-layer bearer to the lower-layer bearer, according to the QoS characteristic value of the lower-layer bearer.

In this embodiment, the upper-layer bearer may be an IP flow or other types of bearer; the DP functional entity takes the signaling parameters configured by RRC as the basic QoS characteristic values and the basic rules for mapping IP flows to lower-layer bearers, performs IP Flow Group, and determines the QoS characteristic value (QoS parameter) of the IP flow group or the lower-layer bearer, and determines each IP flow and the lower-layer bearer. The lower-layer bearer here may be a mapping relationship between a logical channel, a physical channel or other lower-layer bearers;

During the system operation of DP, DP updates the QoS parameters (characteristic values) of IP flows or IP flow groups according to the instruction of the scheduler, thereby adjusting the mapping relationship with the lower-layer bearer. The DP of MAC buffers or multiplexes the data packets on each IP flow to the corresponding lower-layer bearer, and assembles MAC PDU. When the scheduler instructs the DP functional module to perform data reassembly, the DP functional module completes the reassembly of the MAC PDU according to the instruction of the scheduler, and sends the reassembly of the MAC PDU to the HARQ functional entity.

Figure 5:
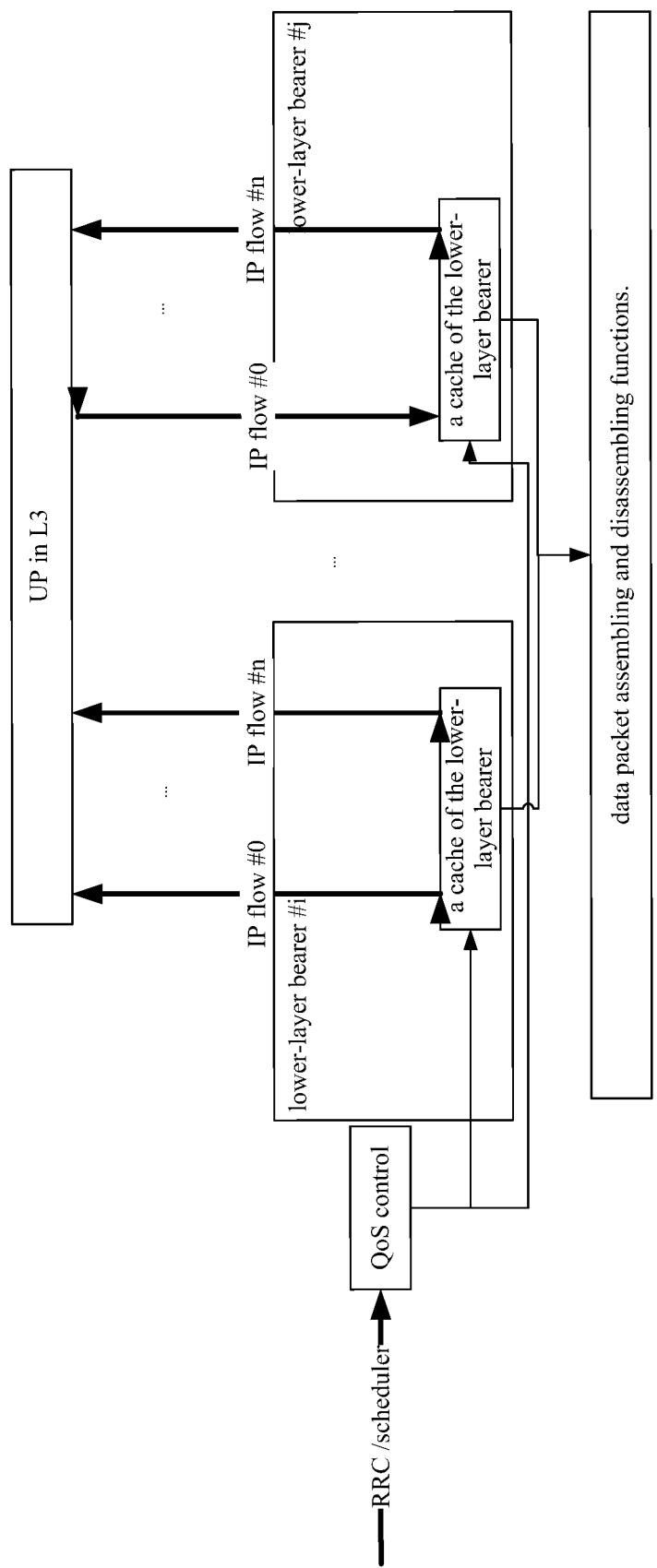
FIG. 5 is a schematic view of a data processing of the DP functional entity of the MAC.

As shown in FIG. 5, the DP functional entity mainly includes QoS Control (QoS control function), cache and data packet assembling and disassembling functions.

The QoS control entity forms a QoS flow group according to the QoS parameter (characteristic value) of each QoS flow configured by RRC signaling, and completes the QoS parameter (characteristic value) setting of the QoS flow group or each lower-layer bearer.

In an optional embodiment of the present disclosure, the mapping, by the second functional entity of the L2, the upper-layer bearer to the lower-layer bearer, according to the QoS characteristic value of the lower-layer bearer, including:

mapping, by the second functional entity of the L2, directly the upper-layer bearer to the lower-layer bearer, in a case that the QoS characteristic value of the lower-layer bearer meets a QoS requirement of the upper-layer bearer; or in a case that the QoS characteristic value of the lower-layer bearer does not meet the QoS requirement of the upper-layer bearer, modifying, by the second functional entity of the L2, the QoS characteristic value thereof to meet the QoS requirement of the upper-layer bearer, mapping, by the second functional entity of the L2, the upper-layer bearer to the lower-layer bearer; or, in a case that there is no lower-layer bearer matching the QoS requirement of the upper-layer bearer, selecting, by the second functional entity of the L2, one lower-layer bearer, according to the QoS parameter of the upper-layer bearer, mapping, by the second functional entity of the L2, the upper-layer bearer to the lower-layer bearer. That is to say, one lower-layer bearer is selected, the QoS parameter capability of the upper-layer bearer is assigned to the lower-layer bearer, and the upper-layer bearer is mapped to the lower-layer bearer.

The lower-layer bearer here may include: a logical channel, a transmission channel and/or a physical channel.

Each of the lower-layer bearers has a data cache unit, data packets of one or more upper-layer bearer are carried on one lower-layer bearer, where each data packet of the upper-layer bearer carried on the lower-layer bearer is cached in the cache of the lower-layer bearer.

In this embodiment, a data buffer is established in units of lower-layer bearers. Each lower-layer bearer has a data cache, and data packets of one or more IP flows are carried on the each lower-layer bearer, where the data packet of each IP flow carried on the lower-layer bearer is cached in the cache of the lower-layer bearer; in the sending direction, the DP functional entity completes the receiving of the data packet of the L3 UP functional entity by the MAC layer and caches them in the corresponding cache according to the RRC and scheduler QoS control signaling and control instructions, and assembles the MAC PDU sent to air interface, according to the instruction of the MAC layer scheduler.

A number of the upper-layer bearer carried on the lower-layer bearer inside the MAC is composed of an identifier of the lower-layer bearer and an identifier of the upper-layer bearer inside the lower-layer bearer. In this embodiment, the IP flow carried on a lower-layer bearer uses the number in the lower-layer bearer. The addressing method of an IP flow is: a method of Lower Bearer ID+IP Flow_Offset_ID, where the Lower Bearer ID is the ID of the lower-layer bearer, and the IP Flow_Offset_ID is the ID of the IP flow in the lower-layer bearer. As shown in FIG. 3, the index value of the IP flow in each lower-layer bearer is 0 as the starting value, for example, in a case that 4 IP flows are carried on the lower-layer bearer, the IDs of these 4 IP flows are 0, 1, 2, and 3.

In an optional embodiment of the present disclosure, the above-mentioned method may also include:
  classifying the upper-layer bearers according to the QoS parameters to obtain a plurality of upper-layer bearer groups.

Optionally, it may be divided into a plurality of IP flow groups according to the QoS requirements of the IP flows carried on the lower-layer bearer, where the QoS requirement of the IP flow group is obtained according to the QoS requirement of each IP flow in the IP flow groups;

The data of all QoS flows of the same IP flow group is cached in a cache of the lower-layer bearer.

In this embodiment, for the management of data packets, the IP flows carried on the lower-layer bearers can be divided into several IP flow groups according to the QoS requirement (index parameter) of each IP flow, and the QoS requirement (index parameter) of each IP flow group is obtained according to the QoS requirement of each IP flow in the IP flow group, for example, by linear fitting, or taking the average value, or taking the maximum value, and other methods. The data cache of the lower-layer bearer can be divided according to the IP flow group, and the data of all QoS flows of the same IP flow group are cached together.

In an optional embodiment of the present disclosure, the QoS characteristic value of the lower-layer bearer is determined according to the QoS characteristic value of the IP flow carried by the lower-layer bearer and the statistical characteristic value of the air interface by the scheduler of the L2 MAC.

Here, specifically, the QoS characteristic value of the lower-layer bearer is jointly determined by the QoS characteristic value of the upper-layer bearer carried on the lower-layer bearer and the statistical characteristic value (long-term air interface data transmission and receiving characteristics, cell load statistical characteristic value) of the air interface by the scheduler, which can be obtained by selecting one of them, or can be obtained by performing mathematical fitting of the two (using normalized calculation primers for performing linear fitting).

In an optional embodiment of the present disclosure, the assembling the data packet into the MAC PDU, and sending the MAC PDU to the L1, including:
  assembling the data packet into the MAC PDU, and sending the MAC PDU to the L1, according to an instruction of the scheduler in the MAC of the L2.

In an optional embodiment of the present disclosure, the data transmission method may further include: performing, by the second functional entity of the L2, reassembly of the MAC PDU on the upper-layer bearer, when data reassembly is performed according to an instruction of the scheduler, further, the reassembly of the MAC PDU may be sent to the HARQ functional entity of the MAC of the L2.

In an optional embodiment of the present disclosure, where at least one of following is carried in the MAC PDU: an identifier (ID) of the lower-layer bearer, an ID of the upper-layer bearer to which the MAC PDU belongs, an identifier N of whether data on a plurality of upper-layer bearers are included at the same time, a data packet length, or a length indicating identifier of the data packet length.

In an optional embodiment of the present disclosure, where the receiving, by the second functional entity of the L2, data from L1, processing the data to obtain the data packet, and sending the data packet to the first functional entity of L3, including:
  receiving, by the second functional entity of the L2, data from the L1 layer;
  processing the received data according to the instruction of the scheduler to obtain MAC PDU;
  parsing the MAC PDU to obtain MAC service data unit (MAC SDU) for the identifier of the lower-layer bearer, and the identifier of the upper-layer bearer in the lower-layer bearer;
  sending the MAC SDU to the first functional entity of the L3.

In the above embodiment, when the scheduler needs to dynamically modify the QoS flow group or the QoS parameter (characteristic value) of each lower-layer bearer, the scheduler sends the air interface data transmission and receiving information, the user's air interface channel quality, the load information of the cell, the probability or number of times the scheduler schedules the user, etc. to the QoS control, the QoS control updates the QoS flow group or QoS parameter (characteristic value) of the lower-layer bearer according to the information; or realizes the mapping of the QoS flow group to a new lower-layer bearer according to the new QoS parameter (characteristic value).

Data Packet assembling and disassembling function (Assembling&disassembling MAC PDU) is responsible for assembling MAC PDU, reassembling MAC PDU, parsing MAC PDU to obtain IP packet.

Figure 6:
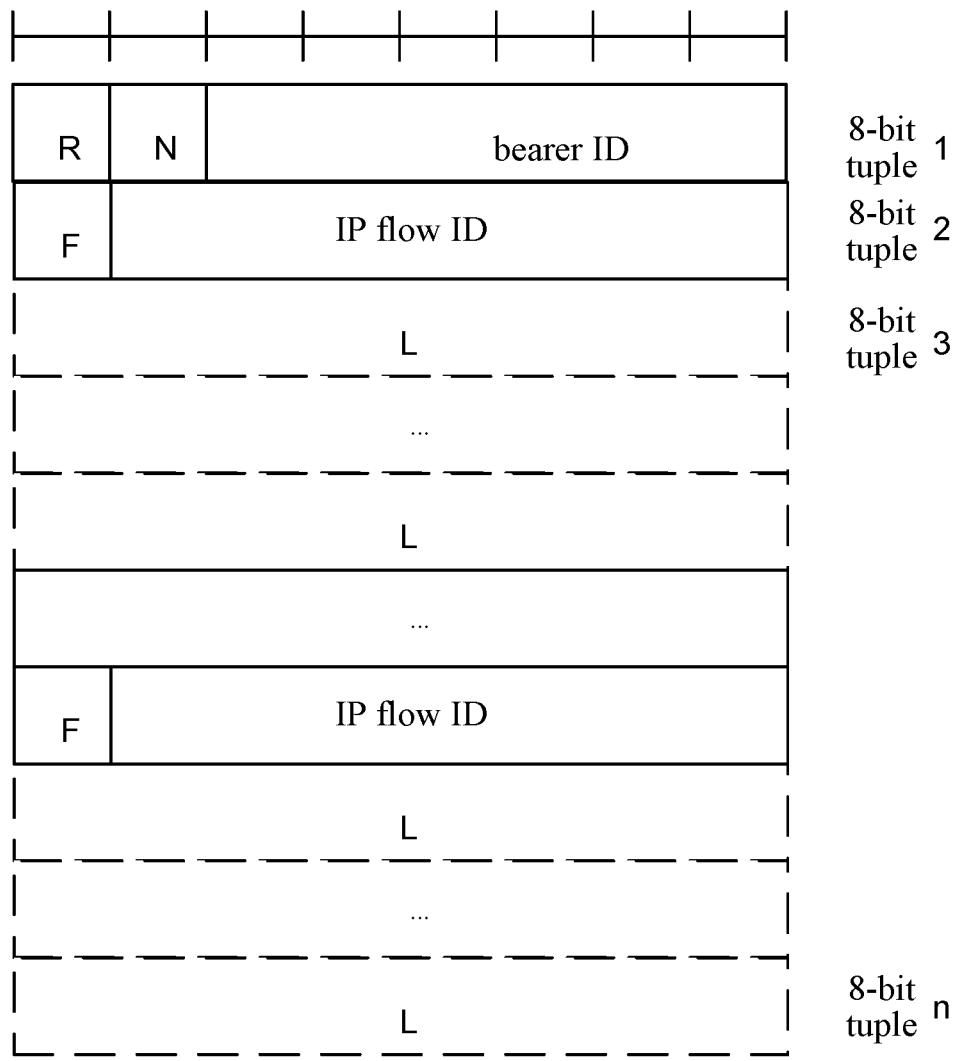
FIG. 6 is a schematic view of a MAC PDU format.

As shown in FIG. 6, in the MAC PDU, it is necessary to carry the ID of the lower-layer bearer, the ID of the IP flow to which the data belongs, the identifier N of whether the data on the multiple IP flows are included at the same time, the length of the data packet, and the length indicating identifier of the data packet length, and other information, where Bearer ID: the lower-layer bearer ID is the ID of the bearer that bears the MAC PDU, and length is one byte or several bits.

IP flow ID: the IP flow ID to which the MAC SDU (IP packet) contained in this MAC PDU belongs, and the length is full-byte or several bits.

N: Whether the data contained in the MAC PDU comes from the multiple IP flows, and the values are "Yes" and "No". For example, 0: no, indicating that there is only one IP flow; 1: yes, indicating more than one IP flow. The length of this field is one bit.

F: the length indicating identifier of the data packet length; the two options of the data packet length are one byte and two bytes. For example, 0: indicates the length of one byte; 1: the length of two bytes. The length of this field is 1 bit.

L: the length field of the data packet, indicating the byte length of the data packet. The length of this field is 8 bits or 16 bits.

N is one bit, the lower-layer bearer ID is 6 bits, the IP flow ID is 7 bits, and F is 1 bit.

When an IP flow has a plurality of data packets to be sent at the same time, the IP flow ID is filled in according to a separate data packet. For example, if IP Flow #0 wants to send three independent data packets, there are three IP Flow #0 and corresponding data length fields at the same time.

After the receiver receives the MAC PDU: the bearer ID and N fields are obtained from the first byte. Whether it is a data packet can be judged by the LC ID. If it is a data packet, it is judged according to the N field whether there are data packets of multiple IP flows.

If there is only a data packet of one IP flow, the F field of the second byte and the IP flow ID field are read. According to the F field, the length of the length field L of the data packet is judged. If L is 8 bits length, the third byte is read as the data packet length, and the fourth byte and subsequent bytes are read as the data packet. If L is a 16 bits length, the third and fourth bytes are read as the data packet lengths, and the fifth and subsequent bytes are read as data packets.

If there are data packets of multiple IP flows, all IP flow information is obtained according to the combination of F+IP Flow ID+L, and corresponding data packet is obtained according to each IP flow information.

As shown in FIG. 6, since the length of the IP flow ID is 7 bits, a maximum of 128 IP flows can be carried on one lower-layer bearer. The sender assemblies the MAC PDU according to the parsing method of the receiver above.

Figure 7:
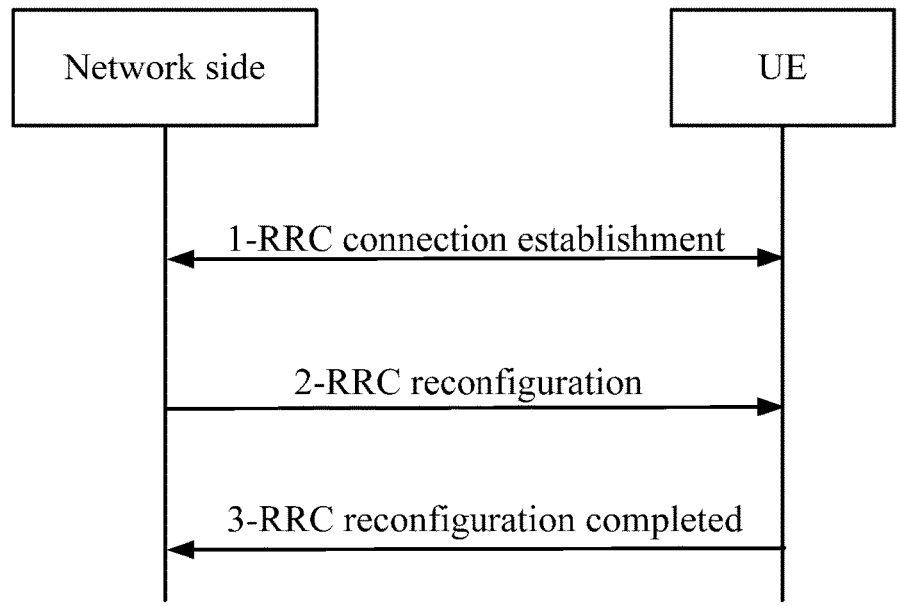
FIG. 7 is a flow of RRC establishment and reconfiguration between a network and a UE.

As shown in FIG. 7, it is a schematic view of a mapping relationship between RRC signaling configuration L3 UP and MAC to IP flow ID in the above-mentioned embodiments of the present disclosure.

Figure 8:
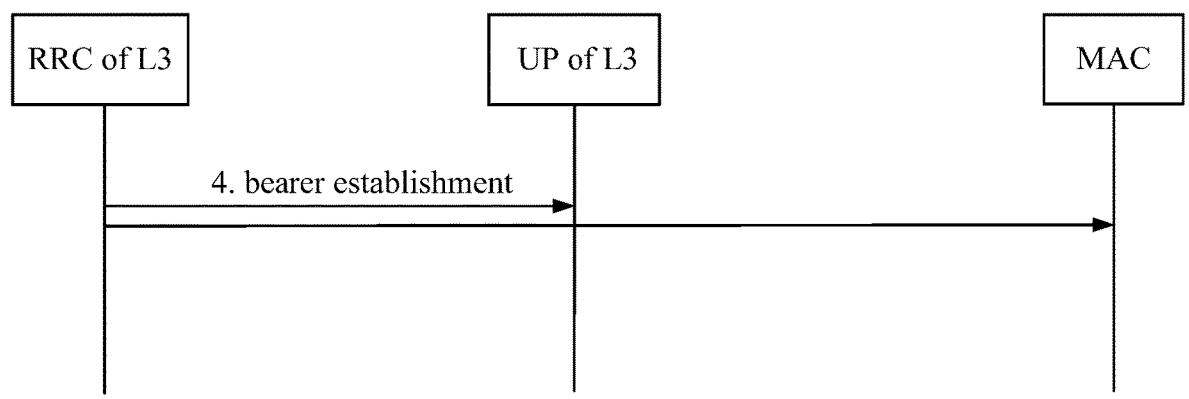
FIG. 8 is a flow of configuring a L3 UP and a MAC functional entity by the network and the UE's internal RRC respectively.

As shown in FIG. 8, it is a process of the network and UE internal RRC respectively configure the L3 UP and MAC functional entity in the above-mentioned embodiments of the present disclosure;

In the RRC reconfiguration process, the configuration of the mapping relationship between the IP flow and the logical channel is completed.

When RRC Reconfiguration (RRC reconfiguration) is generated by RRC of the network side, the lower-layer bearer is described by taking the logical channel as an example.

For logical channel (LC) configuration, the mapping relationship between LC and IP flow is added:

QoS parameter of the LC;
the quantity of IP flows carried on the LC;
list of IP flows carried by this LC:
{
the ID of each IP flow; (the ID is the ID of the IP flow inside the LC, that is, the unified numbering of all IP flows carried on an LC)
the ID or index of the IP flow of L3 UP corresponding to each IP flow; (the mapping relationship between the IP flow carried on the LC and the IP flow of L3 UP is the mapping relationship between the IP flow inside the LC and the global IP flow of the L3)
QoS parameter for each IP flow;
};

For the maximum quantity of IP flows carried on each LC, the IP flow ID defined in FIG. 4 is 7 bits, so the maximum quantity is 128, and the value range of the IP flow ID is: 0~127.

After receiving the signaling configured by the RRC of the network side, the RRC of the UE side configures the MAC and L3 UP of the UE side.

In FIG. 8, the RRCs of the network side and the UE side configure their own MAC and L3 UP respectively.

The mapping relationship between LC and IP flow newly added in LC configuration is configured to MAC and L3 UP respectively:

The content configured for the MAC is: all the above-mentioned contents in the above signaling, except the part of "ID or index of the IP flow of the L3 UP corresponding to each IP flow", which is optional content at the MAC layer and can be configured or not configured.

After receiving the command, the MAC layer classifies the IP flows to generate corresponding IP flow groups, and improves the QoS parameters of LC and IP flows or IP flow groups, according to the QoS parameter of the LC and the QoS parameters of the IP flows, combined with the scheduled air interface status, thereby obtaining the QoS parameters used in MAC scheduling of LG and IP flows (groups) respectively.

The content configured for L3 UP is: in all the above-mentioned contents in the above signaling,
the quantity of IP flows carried on the LC;
list of IP flows carried by this LC:
{
the ID of each IP flow; (the ID is the ID of the IP flow inside the LC, that is, the unified numbering of all IP flows carried on an LC)
the ID or index of the IP flow of L3 UP corresponding to each IP flow; (the mapping relationship between the IP flow carried on the LC and the IP flow of L3 UP is the mapping relationship between the IP flow inside the LC and the global IP flow of the L3)
};

For the maximum quantity of IP flows carried on each LC, the IP flow ID defined in FIG. 4 is 7 bits, so the maximum quantity is 128, and the value range of the IP flow ID is: 0~127.

Except the above contents, for the two parts of "QoS parameter of this LC;" and "QoS parameter of each IP flow", which are optional contents in L3 UP and can be configured or not configured.

In the above-mentioned embodiments of the present disclosure, the L3 UP functional entity receives the IP packet sent by the upper-layer:

Through the ID or index of the IP flow carrying the IP packet, according to the RRC configuration, the LC ID and the flow ID inside the LC corresponding to the IP flow are obtained.

The LC ID and the flow ID inside the LC are attached to the IP packet, which is sent to the MAC layer.

After receiving the data packet, the DP functional entity of the MAC is cached in the data buffer of the LC according to the LC ID and the flow ID inside the LC carried, and the corresponding QoS parameter is obtained.

After the MAC scheduler is scheduled, DP is notified to assemble the corresponding MAC PDU, which is sent to L1 according to the instruction of the scheduler transferred result.

When the retransmitted MAC PDU needs to be reassembled, the HARQ feeds back the reassembled configuration information to the scheduler, and the scheduler instructs the DP to reassemble the MAC PDU.

After receiving the data from L1, the MAC obtains the MAC PDU according to the instruction information of the scheduler. LCD and QoS flow ID are obtained from MAC PDU. According to these two IDs, the parsed IP packet is sent to the receiving module related to L3 UP, and sent to the upper layer through the IP flow, after completing the processing of L3UP.

In the above-mentioned embodiments of the present disclosure, the IP flow is directly mapped to the logical channel; the global IP flow (long ID) and IP flow (short ID) inside LC are used to reduce the overhead of the MAC PDU; the architecture of the 5G MAC with Logical Channel Group (LCG) as the basic unit can be maintained unchanged. The nodes for L2 internal data processing are simplified, there are SDAP/PDCP/RLC in 5G, which involves the mapping of QoS flow to data radio bearer (DRB), and the mapping of DRB to logical channel; thereby realizing the combination of real-time control of the link and near-real-time control of RRC by the MAC scheduler; and reducing the header overhead of SDAP/PDCP/RLC and the system overhead compared with 5G.

The embodiments of the present disclosure also provide a data transmission apparatus, applied to a communication device, where the communication device includes a Layer 3 L3, a Layer 2 L2, and a Layer 1 L1, where data packet transmission is performed between a second functional entity of a media access control (MAC) of the L2 and a first functional entity of the layer 3 L3.

Optionally, the performing data packet transmission between the second functional entity of the MAC of the L2 and the first functional entity of the layer 3 L3 includes:
receiving, by the second functional entity of the MAC of the L2, the data packet sent by the first functional entity of the layer 3 L3, and sending the processed data packet to the layer 1 L1.

Optionally, the performing data packet transmission between the second functional entity of the MAC of the L2 and the first functional entity of the layer 3 L3 includes:
receiving, by the second functional entity of the L2, the data packet sent by the first functional entity of the L3;
assembling, by the second functional entity of the L2, the data packet into a media access control protocol data unit (MAC PDU), and sending the MAC PDU to the L1.

Optionally, the data transmission apparatus further includes: determining, by the second functional entity of the L2, a quality of service (QoS) characteristic value of a lower-layer bearer, according to a QoS flow group or a QoS parameter of the lower-layer bearer configured by the radio resource control (RRC) or instructed by the MAC scheduler; or
mapping, by the second functional entity of the L2, an upper-layer bearer to the lower-layer bearer, according to the QoS characteristic value of the lower-layer bearer.

Optionally, the mapping, by the second functional entity of the L2, the upper-layer bearer to the lower-layer bearer, according to the QoS characteristic value of the lower-layer bearer, including:
mapping, by the second functional entity of the L2, directly the upper-layer bearer to the lower-layer bearer, in a case that the QoS characteristic value of the lower-layer bearer meets a QoS requirement of the upper-layer bearer; or
in a case that the QoS characteristic value of the lower-layer bearer does not meet the QoS requirement of the upper-layer bearer, modifying, by the second functional entity of the L2, the QoS characteristic value thereof to meet the QoS requirement of the upper-layer bearer, mapping, by the second functional entity of the L2, the upper-layer bearer to the lower-layer bearer, or,
in a case that there is no lower-layer bearer matching the QoS requirement of the upper-layer bearer, selecting, by the second functional entity of the L2, one lower-layer bearer, according to the QoS parameter of the upper-layer bearer, mapping, by the second functional entity of the L2, the upper-layer bearer to the lower-layer bearer.

Optionally, the lower-layer bearer includes: a logical channel, a transmission channel and/or a physical channel.

Optionally, each of the lower-layer bearers has a data buffer unit, data packets of one or more upper-layer bearer are carried on one lower-layer bearer, where each data packet of the upper-layer bearer carried on the lower-layer bearer is cached in a cache of the lower-layer bearer.

Optionally, a number of the upper-layer bearer carried on the lower-layer bearer inside the MAC is composed of an identifier of the lower-layer bearer and an identifier of the upper-layer bearer inside the lower-layer bearer.

Optionally, the second functional entity of the L2 classifies the upper-layer bearers according to the QoS parameters to obtain a plurality of upper-layer bearer groups.

Optionally, the QoS characteristic value of the lower-layer bearer is determined according to the QoS characteristic value of the upper-layer bearer carried by the lower-layer bearer and/or according to a statistical characteristic value of an air interface by the scheduler of the L2 MAC.

Optionally, the assembling the data packet into the MAC PDU, and sending the MAC PDU to the L1, including:
assembling the data packet into the MAC PDU, and sending the MAC PDU to the L1, according to an instruction of the scheduler in the MAC of the L2.

Optionally, the data transmission apparatus further includes:
performing reassembly of the MAC PDU on the upper-layer bearer, when the second functional entity of the L2 performs data reassembly according to an instruction of the scheduler.

Optionally, at least one of following is carried in the MAC PDU:
an identifier (ID) of the lower-layer bearer, an ID of the upper-layer bearer to which the MAC PDU belongs, an identifier N of whether data on a plurality of upper-layer bearers are included at the same time, a data packet length, or a length indicating identifier of the data packet length.

Optionally, the receiving, by the second functional entity of the L2, data from L1, processing the data to obtain the data packet, and sending the data packet to the first functional entity of L3, including:

receiving, by the second functional entity of the L2, data from the L1 layer;

processing the received data according to the instruction of the scheduler to obtain MAC PDU;

parsing the MAC PDU to obtain MAC service data unit (MAC SDU) for the identifier of the lower-layer bearer, and the identifier of the upper-layer bearer in the lower-layer bearer;

sending the MAC SDU to the first functional entity of the L3.

It should be noted that this apparatus is an apparatus corresponding to the above-mentioned method shown in FIG. 3, all contents in the above-mentioned method embodiments are applicable to this embodiment, and the same technical effect can also be achieved.

An embodiment of the present disclosure also provides a communication device, including: a Layer 3 L3, a Layer 2 L2, and a Layer 1 L1, where the L2 transceiver is configured to perform data packet transmission between a second functional entity of a media access control (MAC) of the L2 and a first functional entity of a layer 3 L3.

The transceiver of L2 receives the data packet sent by the first functional entity of the layer 3 L3, sends the processed data packet to the layer 1 L1; and receives data from L1, processes the data to obtain a data packet, and then sends the data packet to the first functional entity of L3.

The communication device may be a network side device or a terminal, and the network side device includes: Layer 3 L3, Layer 2 L2, and Layer 1 L1; L2 receives the data packet sent by the first functional entity of L3, and sends the data packet to L1; and then sends the data packet to the terminal through L1;

Correspondingly, data is received from the terminal through L1, the data is parsed to obtain a data packet, and the data packet is sent to the first functional entity of L3.

The terminal includes: Layer 3 L3, Layer 2 L2, and Layer 1 L1, where the L1 of the terminal receives the data sent by the device of the network side, parses the data, obtains a data packet, and sends the data packet to the first functional entity of L3.

Correspondingly, L2 of the terminal receives the data packet sent by the first functional entity of L3, sends the data packet to L1, and then sends the data packet to the network side device through L1.

It should be noted that all the implementation manners in the foregoing method embodiments are applicable to the embodiments of the communication device, and can also achieve the same technical effect.

An embodiment of the present disclosure further provides a communication device, including: a processor, and a memory storing a computer program, and when the computer program is run by the processor, the above-mentioned methods are performed. All the implementation manners in the foregoing method embodiments are applicable to this embodiment, and can also achieve the same technical effect.

An embodiment of the present disclosure also provides a computer-readable storage medium, including instructions, when the instructions are executed by a computer, the instructions enable the computer to perform the method as described above. All the implementation manners in the foregoing method embodiments are applicable to this embodiment, and can also achieve the same technical effect.

Those ordinarily skilled in the art can appreciate that the units and algorithm steps of the examples described in conjunction with the embodiments disclosed herein can be implemented by electronic hardware, or a combination of computer software and electronic hardware. Whether these functions are executed in hardware or software depends on the specific application of the technical solution and design constraints. Professional technicians can use different methods to implement the described functions for each specific application, but such implementation should not be considered beyond the scope of the present disclosure.

Those skilled in the art can clearly understand that for the convenience and brevity of the description, the specific working process of the above-described system, apparatus and unit can refer to the corresponding process in the foregoing method embodiment, which will not be repeated here.

In the embodiments provided in the present disclosure, it should be understood that the disclosed apparatus and method may be implemented in other ways. For example, the apparatus embodiments described above are only schematic. For example, the division of the unit is only a logical function division, and there may be other divisions in actual embodiment, for example, multiple units or components may be combined or can be integrated into another system, or some features can be ignored, or not implemented. In addition, the displayed or discussed mutual coupling or direct coupling or communication connection may be indirect coupling or communication connection through some interfaces, devices or units, and may be in electrical, mechanical, or other forms.

The units described as separate components may or may not be physically separated, and the components displayed as units may or may not be physical units, that is, they may be located in one place, or may be distributed on multiple network units. Some or all of the units may be selected according to actual needs to achieve the objectives of the solutions of the embodiments of the present disclosure.

In addition, each functional unit in each embodiment of the present disclosure may be integrated into one processing unit, or each unit may exist alone physically, or two or more units may be integrated into one unit.

If the functions are implemented in the form of software functional units and sold or used as independent products, they can be stored by a computer-readable storage medium. Based on this understanding, the technical solution of the present disclosure essentially or part of the contribution to the existing technology or the technical solution can be embodied in the form of a software product, the computer software product is stored by a storage medium, including several instructions are configured to enable a computer device (which may be a personal computer, server, or network device, etc.) to perform all or part of the steps of the method in various embodiments of the present disclosure. The foregoing storage media include various media that can store program codes, such as a U disk, a mobile hard disk, a ROM, a RAM, a magnetic disk, or an optical disk.

Those ordinarily skilled in the art can understand that all or part of the processes in the methods of the above embodiments can be realized by controlling related hardware through a computer program, and the program can be stored in a computer-readable storage medium. During execution, the program may include the processes of the embodiments of the above-mentioned methods. The storage medium may be a magnetic disk, an optical disk, a Read-Only Memory (ROM) or a Random Access Memory (RAM), and the like.

It should be understood that the embodiments described in the embodiments of the present disclosure may be implemented by hardware, software, firmware, middleware, microcode or a combination thereof. For hardware implementation, modules, units, and subunits can be implemented in one or more Application Specific Integrated Circuits (ASIC), Digital Signal Processor (DSP), DSP Device (DSPD), Programmable Logic Device (PLD), Field-Programmable Gate Array (FPGA), general-purpose processor, controller, microcontroller, microprocessor, other electronic units or combinations thereof used for implementing the functions of the present disclosure.

For software implementation, the technologies described in the embodiments of the present disclosure may be implemented through modules (such as procedures, functions, etc.) that execute the functions described in the embodiments of the present disclosure. Software codes can be stored in memory and executed by a processor. Memory can be implemented within the processor or external to the processor.

In addition, it should be pointed out that, in the apparatus and method of the present disclosure, obviously, each component or each step can be decomposed and/or reassembled. These decompositions and/or recombinations should be considered as equivalents of the present disclosure. Also, the steps for executing the above series of processes can naturally be executed in chronological order according to the illustrated order, but they are not necessarily executed in chronological order, and some steps can be executed in parallel or independently of each other. For those ordinarily skilled in the art, it can be understood that all or any steps or components of the methods and apparatuses of the present disclosure can be implemented in any computing apparatus (including processors, storage media, etc.) or networks of computing apparatuses in hardware, firmware, software or a combination thereof, which can be realized by those skilled in the art by using their basic programming skills after reading the description of the present disclosure.

Therefore, the object of the present disclosure can also be achieved by running a program or a group of programs on any computing apparatus. The computing apparatus may be a known general-purpose apparatus. Therefore, the object of the present disclosure can also be achieved only by providing a program product including program codes for realizing the method or apparatus. That is, such a program product also constitutes the present disclosure, and a storage medium storing such a program product also constitutes the present disclosure. Obviously, the storage medium may be any known storage medium or any storage medium developed in the future. It should also be pointed out that, in the apparatus and method of the present disclosure, obviously, each component or each step can be decomposed and/or reassembled. These decompositions and/or recombinations should be considered as equivalents of the present disclosure. Also, the steps for performing the above series of processes may naturally be performed in chronological order in the order described, but need not necessarily be performed in chronological order. Certain steps may be performed in parallel or independently of each other.

The above are optional embodiments of the present disclosure. It should be pointed out that those skilled in the art can make some improvements and modifications without departing from the principle of the present disclosure. These improvements and modifications should also be regarded as the protection scope of the present disclosure.

What is claimed is:

1. A data transmission method, applied to a Layer 2 L2, comprising:
   performing data packet transmission between a second functional entity of a media access control (MAC) of L2 and a first functional entity of layer 3 L3, wherein the first functional entity of layer 3 L3 is a functional entity of an access stratum (AS) for processing user plane (UP) data.

2. The data transmission method according to claim 1, wherein the performing data packet transmission between the second functional entity of the MAC of L2 and the first functional entity of L3 comprises:
   receiving, by the second functional entity of the MAC of L2, the data packet sent by the first functional entity of L3, and sending the processed data packet to a layer 1 L1.

3. The data transmission method according to claim 2, wherein the assembling the data packet into the MAC PDU, and sending the MAC PDU to L1, comprises:
   assembling the data packet into the MAC PDU, and sending the MAC PDU to L1, according to an instruction of the scheduler in the MAC of L2.

4. The data transmission method according to claim 1, wherein the performing data packet transmission between the second functional entity of the MAC of the L2 and the first functional entity of the layer 3 L3 comprises:
   receiving, by the second functional entity of the L2, data from L1, processing the data to obtain the data packet, and sending the data packet to the first functional entity of L3.

5. The data transmission method according to claim 4, wherein the Qos characteristic value of the lower-layer bearer is determined according to the QoS characteristic value of the upper-layer bearer carried by the lower-layer bearer and/or according to a statistical characteristic value of an air interface by the scheduler of the L2 MAC.

6. The data transmission method according to claim 5, wherein at least one of the following is carried in the MAC PDU:
   an identifier (ID) of the lower-layer bearer, an ID of the upper-layer bearer to which the MAC PDU belongs, an identifier N of whether data on a plurality of upper-layer bearers are included at the same time, a data packet length, or a length indicating identifier of the data packet length.

7. The data transmission method according to claim 1, the receiving, by the second functional entity of the MAC of L2, the data packet sent by the first functional entity of L3, and sending the processed data packet to the layer 1 L1, comprising:
   receiving, by the second functional entity of L2, the data packet sent by the first functional entity of L3;
   assembling, by the second functional entity of the L2, the data packet into a media access control protocol data unit (MAC PDU), and sending the MAC PDU to the L1.

8. The data transmission method according to claim 7, further comprising at least one of:
   determining, by the second functional entity of L2, a quality of service (Qos) characteristic value of a lower-layer bearer according to a QoS flow group or a QoS parameter of the lower-layer bearer configured by the radio resource control (RRC) or instructed by the MAC scheduler; or mapping, by the second functional entity of the L2, an upper-layer bearer to the lower-layer bearer according to the QoS characteristic value of the lower-layer bearer.

9. The data transmission method according to claim 8, wherein the mapping, by the second functional entity of L2, the upper-layer bearer to the lower-layer bearer according to the QoS characteristic value of the lower-layer bearer, comprising:
   in a case that the QoS characteristic value of the lower-layer bearer meets a Qos requirement of the upper-layer bearer, mapping, by the second functional entity of L2, the upper-layer bearer to the lower-layer bearer directly; or
   in a case that the QoS characteristic value of the lower-layer bearer does not meet the QoS requirement of the upper-layer bearer, modifying, by the second functional entity of L2, the QoS characteristic value thereof to meet the QoS requirement of the upper-layer bearer, and mapping the upper-layer bearer to the lower-layer bearer; or,
   in a case that there is no lower-layer bearer matching the QoS requirement of the upper-layer bearer, selecting, by the second functional entity of L2, one lower-layer bearer according to the QoS parameter of the upper-layer bearer, and mapping the upper-layer bearer to the lower-layer bearer.

10. The data transmission method according to claim 8, wherein the lower-layer bearer comprises: a logical channel, a transmission channel and/or a physical channel.

11. The data transmission method according to claim 8, wherein each of the lower-layer bearers has a data buffer unit, data packets of one or more upper-layer bearer are carried on one lower-layer bearer, wherein each data packet of the upper-layer bearer carried on the lower-layer bearer is cached in a cache of the lower-layer bearer.

12. The data transmission method according to claim 8, wherein a number of the upper-layer bearer carried on the lower-layer bearer inside the MAC is composed of an identifier of the lower-layer bearer and an identifier of the upper-layer bearer inside the lower-layer bearer.

13. The data transmission method according to claim 8, further comprising:
   classifying the upper-layer bearers according to the QoS parameters to obtain a plurality of upper-layer bearer groups.

14. The data transmission method according to claim 13, further comprising:
   performing reassembly of the MAC PDU on the upper-layer bearer, when the second functional entity of the L2 performs data reassembly according to an instruction of the scheduler.

15. The data transmission method according to claim 13, wherein at least one of the following is carried in the MAC PDU:
   an identifier (ID) of the lower-layer bearer, an ID of the upper-layer bearer to which the MAC PDU belongs, an identifier N of whether data on a plurality of upper-layer bearers are included at the same time, a data packet length, or a length indicating identifier of the data packet length.

16. The data transmission method according to claim 1, wherein the receiving, by the second functional entity of the L2, data from L1, processing the data to obtain the data packet, and sending the data packet to the first functional entity of L3, comprises:
   receiving, by the second functional entity of the L2, data from the L1 layer;
   processing the received data according to the instruction of the scheduler to obtain MAC PDU;
   parsing the MAC PDU to obtain MAC service data unit (MAC SDU) for the identifier of the lower-layer bearer, and the identifier of the upper-layer bearer in the lower-layer bearer;
   sending the MAC SDU to the first functional entity of the L3.

17. A communication device, comprising: a processor, and a memory storing a computer program, when the computer program is run by the processor, the method according to claim 1 is performed.

18. A computer-readable storage medium, comprising instructions, wherein when the instructions are run on a computer, the computer is enabled to perform the method according to claim 1.

19. A data transmission apparatus, applied to a communication device, wherein the communication device comprises a Layer 3 L3, a Layer 2 L2, and a Layer 1 L1, wherein data packet transmission is performed between a second functional entity of a media access control (MAC) of the L2 and a first functional entity of the layer 3 L3, the first functional entity of the layer 3 L3 is a functional entity of an access stratum (AS) for processing user plane (UP) data.

20. A communication device, comprising: a Layer 3 L3, a Layer 2 L2, and a Layer 1 L1, wherein a transceiver of the L2 is configured to transmit data packet between a second functional entity of a media access control (MAC) of L2 and a first functional entity of the layer 3 L3, and the first functional entity of the layer 3 L3 is a functional entity of an access stratum (AS) for processing user plane (UP) data.

* * * * *